(12) United States Patent
Chu

(10) Patent No.: US 6,431,803 B1
(45) Date of Patent: Aug. 13, 2002

(54) INSTANTANEOUS CLAMPING/ UNCLAMPING MECHANISM FOR CNC MACHINE SPINDLE TOOL UNITS

(75) Inventor: Chih-Yaung Chu, Taipei (TW)

(73) Assignee: Fair Friend Enterprise Co, Ltd., Taipei (TW)

( * ) Notice: Subject to any disclaimer, the term of this patent is extended or adjusted under 35 U.S.C. 154(b) by 34 days.

(21) Appl. No.: 09/637,693

(22) Filed: Aug. 15, 2000

(51) Int. Cl.$^7$ ................................................ B23C 1/00
(52) U.S. Cl. .................................... 409/233; 408/239 R
(58) Field of Search ............................... 409/233, 231, 409/232; 408/239 R, 239 A; 279/4.01

(56) References Cited

U.S. PATENT DOCUMENTS

| | | | | |
|---|---|---|---|---|
| 4,863,324 A | * | 9/1989 | Blessing | 409/233 |
| 5,743,687 A | * | 4/1998 | Ribic et al. | 409/233 |
| 5,941,146 A | * | 8/1999 | Link | 279/4.01 |
| 5,997,011 A | * | 12/1999 | Nordquist | 279/4.01 |

FOREIGN PATENT DOCUMENTS

| | | | | |
|---|---|---|---|---|
| CH | 606819 A | * | 11/1978 | |
| DE | 3428745 A | * | 2/1986 | 409/233 |
| DE | 4401779 A1 | * | 7/1995 | |
| EP | 292022 A | * | 11/1988 | 409/233 |
| JP | 59-42234 A | * | 3/1984 | 409/233 |
| SU | 500911 A | * | 3/1976 | 409/233 |
| SU | 510319 A | * | 6/1976 | 409/233 |
| SU | 971582 A | * | 11/1982 | 409/233 |
| SU | 1118487 A | * | 10/1984 | 409/233 |
| SU | 1685631 A | * | 10/1991 | 409/233 |

OTHER PUBLICATIONS

Millwrights and Mechanics Guide, 4$^{th}$ ed., 1989, pp. 929–940.*

* cited by examiner

Primary Examiner—A. L. Wellington
Assistant Examiner—Erica E. Cadugan
(74) Attorney, Agent, or Firm—Rosenberg, Klein & Lee

(57) ABSTRACT

An instantaneous clamping/unclamping mechanism for a CNC machine tools is provided. The two stage procedure tool separating function includes an oil cylinder with a piston rod passing through its inner part and engaged with a first piston for tool separating therein and a second piston for tool presetting installed at the bottom of the first piston and formed in slidable relation with the piston rod. The space in the oil cylinder is therefore separated by the two pistons into upper, middle and lower three oil flowing chambers. Further, an adjusting screw is provided at the bottom of the piston rod and is connected with the tool pot. Two mechanism valves are provided for controlling the direction of oil flow for operating the piston rod to perform two stage procedures of tool separation. The position of the two valves is controlled by a valve position changeover mechanism. A driving means for the clamping/unclamping arm is interconnected with the valve position changeover mechanism to perform close joint operation thereby achieving well matched action of tool separation and replacement.

4 Claims, 3 Drawing Sheets

INSTANTANEOUS CLAMPING/ UNCLAMPING MECHANISM FOR CNC MACHINE SPINDLE TOOL UNITS

BACKGROUND OF THE INVENTION

1. Field of the Invention

The present invention relates to an instantaneous clamping/unclamping mechanism for a CNC machine tools, and more particularly, to a clamping/unclamping machine for a CNC machine tools which can instantaneously separate a tool from a holder and replace it with another one without miss operation.

2. Description of the Prior Art

A conventional tool clamping/unclamping mechanism for a CNC machine tools comprises an tool pot in a spindle; a tool pot; a compression spring installed between the spindle and the tool pot; a oil cylinder mounted over the tool pot with a piston and a piston rod passing through the cylinder; and an adjusting screw attached to the tool pot from the bottom of the piston rod. With such constitution a clearance is formed between the tool pot and the oil cylinder helpful for preventing miss operation of the tool pot, such as dropping a tool in the case the tool is not to be replaced. When the time comes for a tool to be separated, being actuated by the oil pressure, the piston rod has to travel a certain distance in advance in order to eliminate the clearance, and continues to perform a stroke for tool replacement. However, there are disadvantages inherent to the constitution of such clamping/unclamping mechanism i.e.:

(1) A time delay is produced due to the above described piston travel procedure for eliminating the clearance before tool unclamping to take place. Should the time delay be too long, a tool arm which has been moved to a position ready for performing its function, is apt to hit the tool which is still on the tool pot and be damaged therefor; or, should the time delay be too short, a tool is separated from the tool pot and dropped on the ground before it is taken up by the tool arm whereby causing a dangerous state.

(2) The clearance influences greatly the performance of tools clamping/unclamping, the tedious work of adjusting the clearance is very important and sophisticated that has to rely on a skilled and experienced workman to perform. Even so, the occurrence of an error is inevitable. Besides, the clearance is required to re-adjust in the case the mechanism is detached and re-assembled for maintenance.

(3) The oil cylinder and the tool arm are actuated and controlled by different systems. However, the action of the two systems is difficult to keep pace with each other for performing accurate and highly efficient tool unclamping.

SUMMARY OF THE INVENTION

It is an object of the present invention to provide an instantaneous clamping/unclamping mechanism for a CNC machine tools by employing one oil cylinder and two pistons working mode to perform two stage procedures of tool separating from a spindle, which can further precisely keep pace with the clamping/unclamping procedure to be carried out by a tool arm so as to prevent possible accidental errors inherent to a conventional mechanism as described above and achieve a reliable instantaneous clamping/unclamping effect for a CNC machine tools.

To achieve the object mentioned above, the instantaneous clamping/unclamping mechanism with two stage procedure tool separating function comprises the components of a oil cylinder with a piston rod passing through its inner part and engaged with a first piston for tool separating installed therein, a second piston for tool presetting installed at the bottom of the first piston and is in slidable relation with the piston rod. The space in the oil cylinder is therefore separated by the two pistons into upper, middle and lower three oil flowing chambers. Further, an adjusting screw is provided at the bottom of the piston rod and is connected with the tool pot. Two mechanical valves are provided for controlling the direction of oil flow for operating the piston rod to perform two stage procedures of tool separation. The position of the two valves is controlled by a valve position changeover mechanism. A driving means for the tool arm is interconnected with the valve position changeover mechanism to perform close joint operation thereby achieving well matched action of tool separation and replacement.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
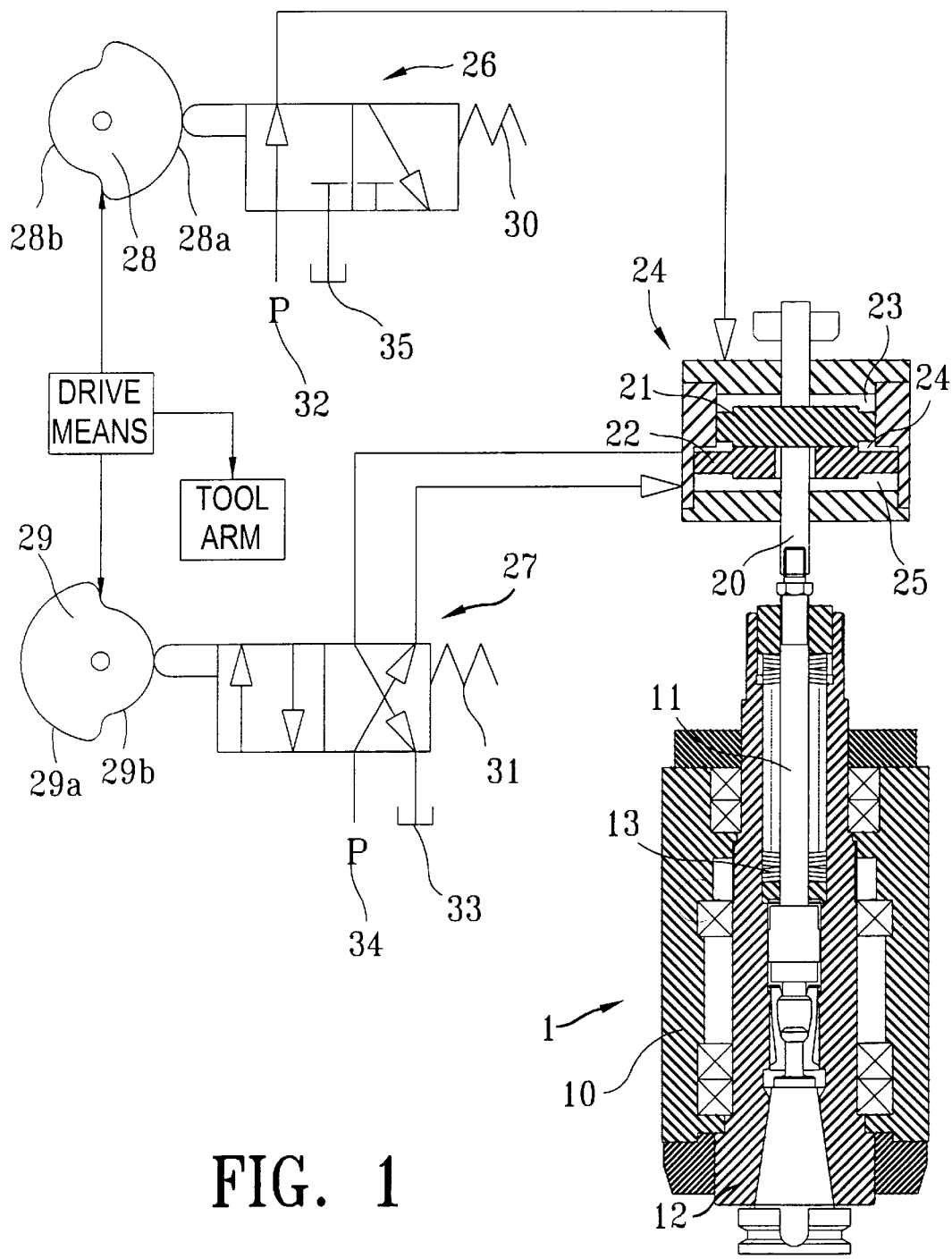
FIG. 1 is a schematic diagram showing the instantaneous clamping/unclamping mechanism for a CNC machine tools of the present invention wherein the operation of tool separation is about to happen.

As shown in the FIG. 1, the instantaneous clamping/unclamping mechanism for a CNC machine tools comprises a spindle head 1 composed of a main body 10 with an tool pot 11 installed therein, and a tool is set on its bottom and a compression spring 13 is interposed between the main body 10 and the tool pot 11; a oil cylinder 1 has a piston rod 20 passing through its inner part; a first piston for tool separating 21 is installed in the oil cylinder 2 and attached to the piston rod; and a second piston 22 for tool presetting is installed at the bottom of the first piston 21 and is in slidable relation with the piston rod 20. The space in the oil cylinder 2 is therefore separated into upper, middle and lower three oil flowing chamber 23, 24, 25. The upper oil flowing chamber 23 is communicated with a first double port mechanical valve 26 while the middle and lower oil flowing chambers 24, 25 are communicated with the two respective ports of a second double port mechanical valve 27. Both valves 26, 27 have two ports and two positions, and the changeover of their valve positions are controlled by flanges 28a, 29a and recessed edges 28b, 29b of first and second flat plate cams 28, 29 respectively, and recover their valve positions by the actuation of springs 30, 31 installed at the sides of the valves 26, 27 respectively. The two flat plate cams 28, 29 are simultaneously driven by a driving means (not shown) which also drives a tool arm.

In the case of separating a tool, the flat plate cams 28, 29 are simultaneously driven by the same driving means as that driving the clamping/unclamping arm so that the flange 28a is pressed against the first valve 26 to set its valve position to the first position. As a result, an oil pump 32 pumps up oil into the upper oil flowing chamber 23. On the other hand, the recessed edge 29b of the second flat plate cam 29 is pressed against the second valve 27 to set its valve position to the second position. As a result, the oil in the middle oil flowing chamber 24 returns to an oil tank 33. By another oil pump 34, oil is pumped into the lower oil flowing chamber 25 so as to move the first piston 21 for tool separating downward and to move the second piston 22 for tool presetting upward thereby matching both pistons 21 and 22 in a tool separating position. At this time, the piston rod 20 which is following the downward displacement of the first piston 21, pushes the tool pot 11 to travel downward a certain appropriate distance and compress the spring 13 so that the tool comes to a moment ready for separating.

Figure 2:
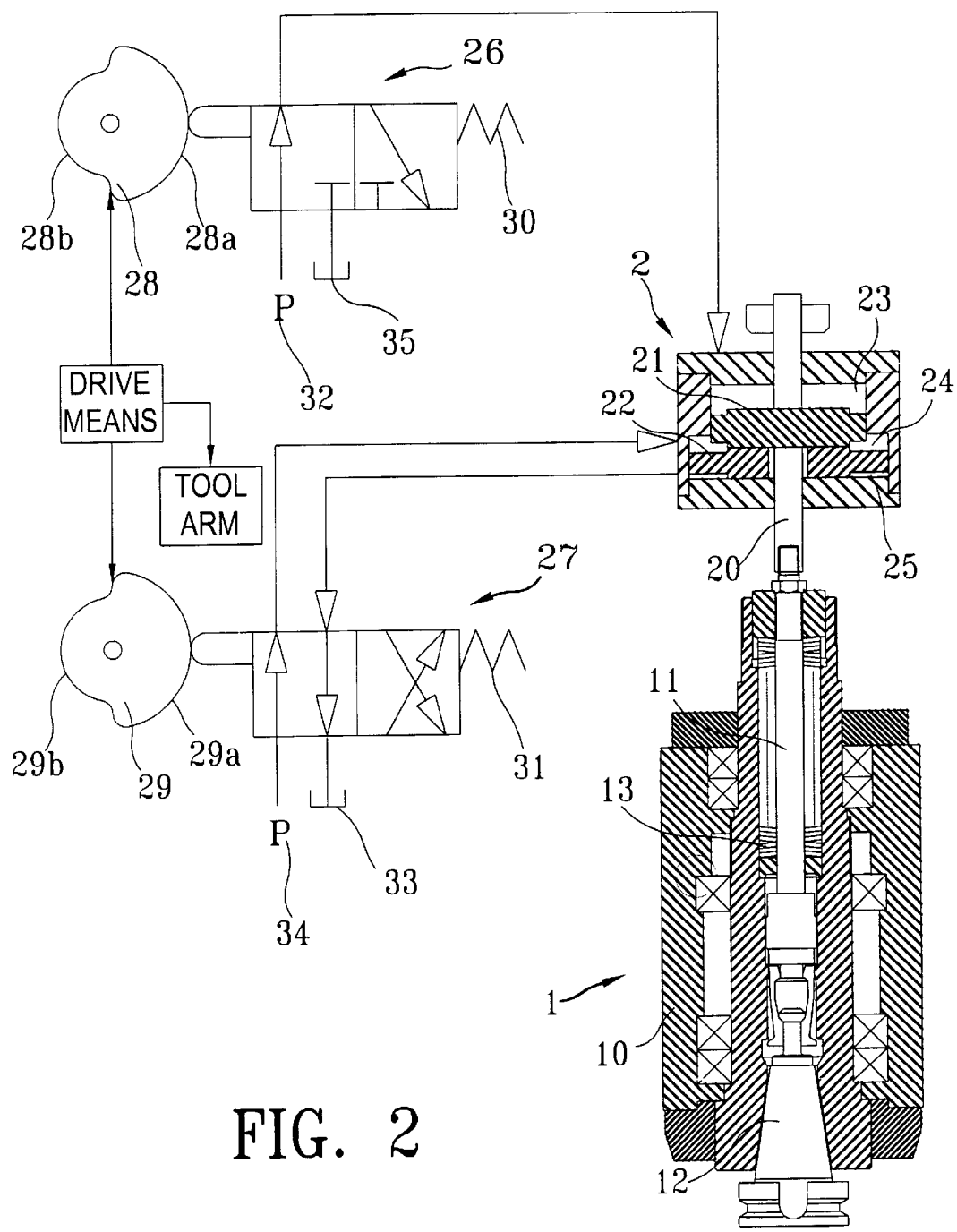
FIG. 2 is a drawing showing the operation of tool separation of FIG. 1.

Referring to FIG. 2, a drawing showing the operation of tool separation of FIG. 1, as shown in the drawing, herein, both flat plate cams 28, 29 are driven simultaneously by the driving means as that drives the tool arm. When the tool arm is about to take up a tool, the flange 29a of the flat plate cam 29 against the spring 31 to actuate and change the valve position of the second valve 27 to the first position while keeping the oil pump 34 in idle state so as to discharge the oil in the lower oil flowing chamber 25, and introduce the oil into the upper oil flowing chamber 23 by way of the first valve 26. At this time, the piston rod moves downward to push the tool pot 11, and in turn, the tool pot 11 separates the tool 12, the tool arm which is simultaneously driven by the driving means performs the unclamping at the very moment so that the errors such as dropping the tool, damaging the arm by impacting the tool body or failing to separate the tool can be prevented by this two stage procedures.

Figure 3:
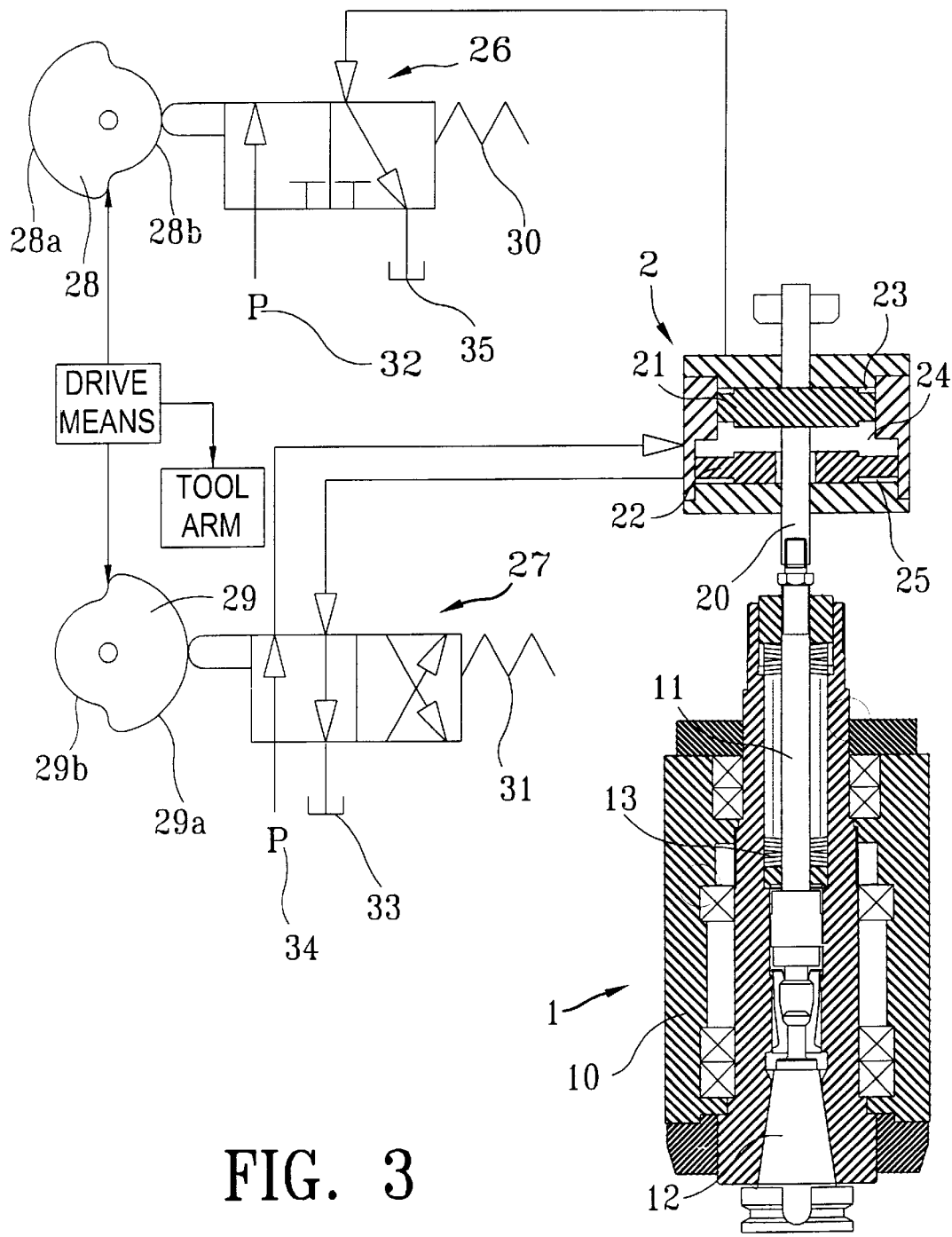
FIG. 3 is a drawing showing the spindle of the clamping/unclamping mechanism is returned to its original tool engaging state after having performed a tool separating operation.

Referring to FIG. 3, showing a state of the spindle of the clamping/unclamping mechanism after having performed a clamping/unclamping operation ready waiting for next operation, as shown in the drawing, the recessed edge 28b of the first flat plate cam 28 controls its corresponding first valve 26 so that the spring 30 can actuate the first valve 26 to change its valve position to the second position whereby conducting the oil in the upper oil flowing chamber 23 back to the oil tank 35. On the other hand, the flange 29a of the second flat plate cam 29 controls its corresponding second valve 27 to keep at the first valve position. Here, at this time the oil is conducted into the middle oil flowing chamber 24 by the oil pump 34, and the oil in the lower oil flowing chamber 25 returns to the oil tank 33. The first piston 21 for tool separating moves upward and is apart from the second piston 22 for tool presetting, and the piston rod 20 follows the upward movement of the first piston 21 as it is incorporated with each other. The tool pot 11 together with the tool 12 is pulled back to the initially engaged state by the restoring force of the compressed spring 13 interposed between the spindle 10 and the tool pot 11, and the mechanism is ready for next operation.

It is clear from the above description that the instantaneous clamping/unclamping mechanism for a CNC machine tools of the present invention constructed as such is able to perform instantaneous two stage procedures of tool separating and tool unclamping without any errors such as dropping the tool, damaging the tool arm by impacting the tool body or failing to separate the tool.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A clamping and unclamping mechanism for effecting presetting of a tool in and separation of the tool from a spindle head comprising:

a spindle head having a main body, said main body having a main body passage formed therethrough, said main body passage slidably receiving a tool contacting member for contacting and receiving a tool to be separated from said spindle head, said main body and said tool contacting member being biased with respect to one another by a spring member;

an oil cylinder having a piston rod slidably received therein, a first piston being fixedly secured to said piston rod, a second piston having a substantially annular shape being slidably mounted on said piston rod and positioned beneath said first piston, said first and second pistons separating an interior region of said oil cylinder into upper, middle, and lower oil flow chambers, a lower end of said piston rod contacting said tool contacting member;

a primary valve in fluid communication with said upper oil flow chamber of said oil cylinder, said primary valve having first and second primary operative positions, said first primary operative position allowing primary oil to flow into said upper flow chamber, said second primary operative position allowing said primary oil to flow out of said upper flow chamber, said primary valve being in contact with a first rotatable flat plate cam, said first rotatable flat plate cam actuating and controlling said primary valve and thereby controlling the tool separation; and, a secondary valve having first and second valve ports in fluid communication with said middle and lower flow chambers, respectively, said secondary valve having first and second secondary operative positions, said first secondary operative position allowing secondary oil to selectively flow out of said lower flow chamber and selectively flow into said middle flow chamber, said second secondary operative position allowing said secondary oil to selectively flow out of said middle flow chamber and selectively flow into said lower flow chamber, said secondary valve being in contact with a second rotatable flat plate cam, said second rotatable flat plate cam actuating and controlling said secondary valve and thereby controlling the tool presetting.

2. The clamping and unclamping mechanism as recited in claim 1 wherein said primary and secondary valves are mechanical valves.

3. The clamping and unclamping mechanism as recited in claim 2 wherein each of said primary and secondary valves is in contact with a respective biasing spring member for further control of said first and second primary and secondary operative positions, respectively.

4. The clamping and unclamping mechanism as recited in claim 1 wherein said first and second rotatable flat plate cams are driven by an external driving means, said external driving means further driving a tool arm.

* * * * *